US009244642B2

(12) United States Patent
Segawa (10) Patent No.: US 9,244,642 B2
(45) Date of Patent: Jan. 26, 2016

(54) INFORMATION PROCESSING APPARATUS FOR PRINTING SPECIAL SHEET OR SPECIAL DESIGN AND METHOD USING THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yusuke Segawa, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 51 days.

(21) Appl. No.: 14/070,741

(22) Filed: Nov. 4, 2013

(65) Prior Publication Data

US 2015/0124283 A1 May 7, 2015

(51) Int. Cl.
  *G06F 3/12* (2006.01)
  *G06K 15/02* (2006.01)
  *G06K 15/00* (2006.01)

(52) U.S. Cl.
  CPC ............ *G06F 3/1243* (2013.01); *G06K 15/002* (2013.01); *G06K 15/021* (2013.01); *G06K 15/1882* (2013.01)

(58) Field of Classification Search
  None
  See application file for complete search history.

(56) References Cited

U.S. PATENT DOCUMENTS

| | | | | |
|---|---|---|---|---|
| 6,141,434 A * | 10/2000 | Christian et al. | | 382/103 |
| 6,801,962 B2 * | 10/2004 | Taniguchi et al. | | 710/33 |
| 7,436,530 B2 * | 10/2008 | Terrill et al. | | 358/1.15 |
| 2007/0013935 A1 * | 1/2007 | Uchida | | 358/1.13 |
| 2007/0230972 A1 * | 10/2007 | Akashi | | 399/16 |
| 2007/0285707 A1 * | 12/2007 | Muramatsu | | 358/1.15 |
| 2008/0181637 A1 * | 7/2008 | Toda | | 399/45 |
| 2009/0268261 A1 * | 10/2009 | Banton et al. | | 358/474 |
| 2011/0261390 A1 * | 10/2011 | Ray et al. | | 358/1.15 |
| 2014/0052463 A1 * | 2/2014 | Cashman et al. | | 705/2 |

FOREIGN PATENT DOCUMENTS

JP   2001-344484   12/2001

* cited by examiner

*Primary Examiner* — Ming Hon
(74) *Attorney, Agent, or Firm* — Amin, Turocy & Watson, LLP (57) ABSTRACT

In accordance with one embodiment, an information processing apparatus comprises an interface and a control section. The interface receives the identification information of a user-designated sheet sent from a first terminal and the position information of the first terminal. The control section specifies, based on the identification information of the sheet and the position information, an information terminal capable of forming an image on the sheet designated by a user from the data stored in a storage section and sends information relating to the specified information terminal to the first terminal using the interface.

10 Claims, 9 Drawing Sheets

| SEQUENCE NUMBER 701 | DESIGN PATTERN 702 | DISTANCE TO STORE 703 | REMAINING NUMBER 704 | DISTANCE TO KIOSK TERMINAL 705 |
|---|---|---|---|---|
| 1 | DESIGN A | 300m | 60 | 350m |
| 2 | DESIGN A | 2000m | 30 | 2200m |
| 3 | DESIGN A | 4000m | 50 | 4000m |

204

| SERVER | STORE TERMINAL | KIOSK TERMINAL | PORTABLE TERMINAL |
|---|---|---|---|
| DESIGN TEMPLATE INFORMATION | IDENTIFICATION INFORMATION AND REMAINING NUMBER OF SHEETS | IDENTIFICATION INFORMATION OF PRINTABLE SHEETS | (DESIGN TEMPLATE) |
| STORE INFORMATION | ARRIVAL TIME OF SHEETS | OPERATING CONDITION | OBJECT |
| IDENTIFICATION INFORMATION OF SHEET DEALT IN EACH STORE | | (PRINTING DATA FROM USER) | (STORE INFORMATION) |
| KIOSK TERMINAL INFORMATION | | | (KIOSK TERMINAL INFORMATION) |
| SHEET THAT CAN BE PRINTED BY KIOSK TERMINAL | | | POSITION INFORMATION |
| (OPERATING CONDITION OF KIOSK TERMINAL) | | | |
| (POSITION INFORMATION OF USER) | | | |
| (REMAINING NUMBER AND ARRIVAL TIME OF SHEETS) | | | |

INFORMATION PROCESSING APPARATUS FOR PRINTING SPECIAL SHEET OR SPECIAL DESIGN AND METHOD USING THE SAME

FIELD

Embodiments described herein relate to a technology in which a kiosk terminal is used to form an image on a sheet.

BACKGROUND

Conventionally, there is provided a service of ordering and obtaining printing targets such as postcards having a favorable design in an order-made manner. However, such a service is not used widely due to the limitations in quantity and cost.

Besides, a kiosk terminal is available which is arranged in a store or facility for a user to operate to obtain desired information. The kiosk terminal may also be capable of accepting a printing job and printing on a sheet.

When printing with the kiosk terminal, a user generally acquires a design from the Internet and the like and then carries out an editing job of, for example, inputting an address and an addressee and changing part of the design. Then, the user stores the edited data in a portable flash memory or the like and prints the edited data using a kiosk terminal arranged in a store nearby.

The kiosk terminal can only prints postcards of specific sizes or specific materials but cannot print postcards of other sizes or materials. Moreover, the kiosk terminal cannot print or form an image with, for example, gold leaf since the terminal doesn't comprise special coloring material. In this case, it is needed to use a sheet which is specially processed in advance and sold in a store to carry out a printing job, however, the store does not deal with the specially processed sheet, and sometimes it is even impossible to acquire a processed sheet.

Thus, when printing with a kiosk terminal which is arranged in a store and cannot be widely used due to the order-made manner, how to obtain a printed sheet, and that whether or not the kiosk terminal deals with the sheet become a problem. In order to solve these problems, information such as 'whether or not a sheet can be obtained from a store nearby' and ' whether or not the sheet, if obtained, can be printed' needs to be acquired when printing a desirable design.

DETAILED DESCRIPTION

In accordance with one embodiment, an information processing apparatus comprises an interface and a control section. The interface receives the identification information of a user-designated sheet sent from a first terminal and the position information of the first terminal. The control section specifies, based on the identification information of the sheet and the position information, an information terminal capable of forming an image on the sheet designated by a user from the data stored in a storage section and sends information relating to the specified information terminal to the first terminal using the interface.

The embodiment is described below with reference to accompanying drawings.

Figure 1:
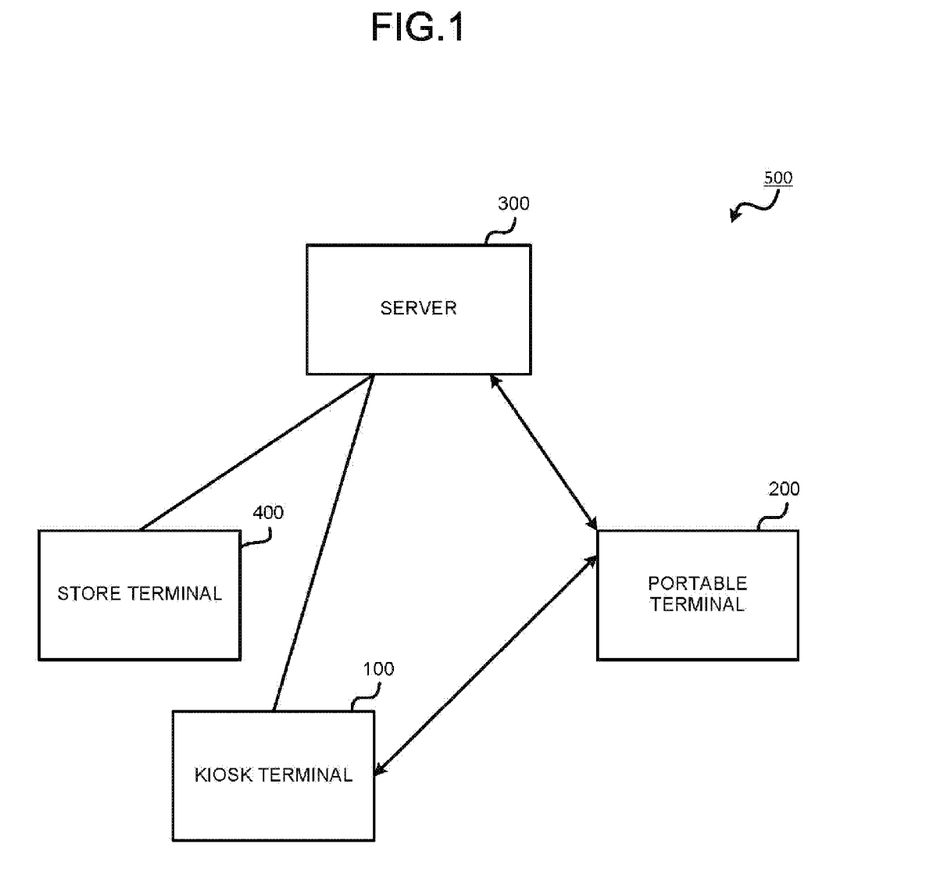
FIG. 1 is a diagram illustrating an example of the whole constitution of a printing system according to an embodiment.

FIG. 1 is a diagram illustrating an example of the whole constitution of the embodiment. In accordance with the embodiment, a printing system 500 comprises a kiosk terminal 100, a portable terminal 200, a server 300 and a store terminal 400. The kiosk terminal 100 and the store terminal 400 are located in the premises of the same store or the same facility, and the server 300 is located outside the premises. Further, the portable terminal 200 is held by a user desiring for a printing job. Further, the portable terminal may also be a stationary type personal computer.

Data transmission/reception is continuously carried out between the kiosk terminal 100 and the server 300 and between the store terminal 400 and the server 300. Data transmission/reception is carried out between the server 300 and the portable terminal 200 in response to a request from the portable terminal 200. The transmission/reception of printing data and the like is carried out between the kiosk terminal 100 and the portable terminal 200 through near-distance wireless communication or LAN (Local Area Network) communication.

Further, in FIG. 1, there is only one store or facility and only one group of store terminal and kiosk terminal, however, it is set in the present embodiment that there are a plurality of stores and facilities and a plurality of groups of kiosk terminals 100 and store terminals 400 (it may also be configured by one group of store terminal and kiosk terminal as shown in FIG. 1). Further, as to the portable terminal, only the portable terminal 200 is shown in FIG. 1, however, it should be appreciated that there may be a plurality of portable terminals and that the printing system 500 may be used by a plurality of users. The server 300 may be a redundant constitution as well. Further, the kiosk terminal 100 may have the functions of the store terminal 400 or be integrated with the store terminal 400, or the kiosk terminal 100 may have the functions of the server 300 or be integrated with the server 300.

Figure 2:
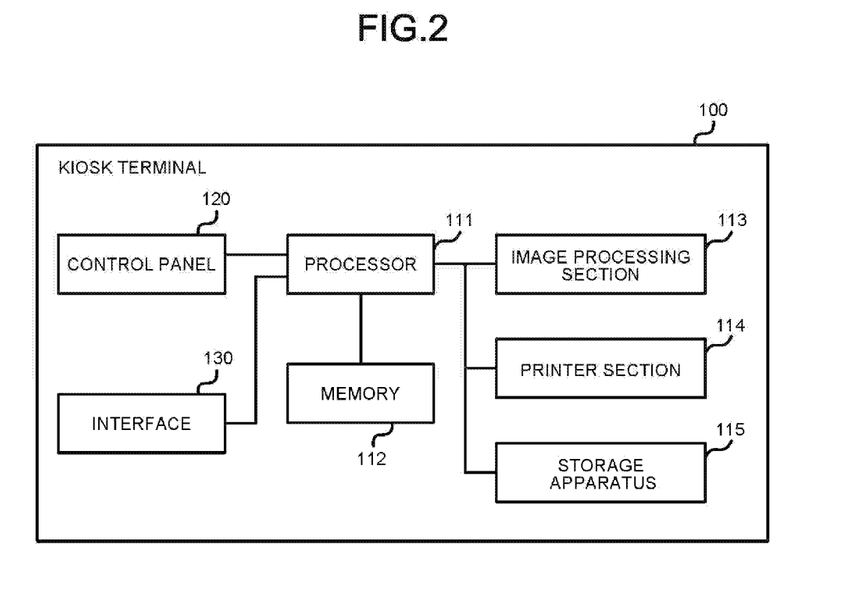
FIG. 2 is a block diagram illustrating a constitution example of a kiosk terminal.

An internal constitution example of each apparatus is described below with reference to FIG. 2-FIG. 5. FIG. 2 is a block diagram illustrating a constitution example of the kiosk terminal 100. The kiosk terminal 100 comprises a processor 111, a memory 112, an image processing section 113, a printer section 114, a storage apparatus 115, a control panel 120 and an interface 130.

The processor 111 is an arithmetic apparatus such as a CPU (Central Processing Unit) for controlling each piece of hardware in the kiosk terminal 100. The memory 112 includes a RAM (Random Access Memory) which stores data in a volatile manner and a ROM (Read Only Memory) which stores data in a non-volatile manner.

The image processing section 113 is a unit which is mounted through an ASIC (Application specific integrated circuit) to carry out an image quality adjustment and an image processing during a printing process. The printer section 114, which is a unit for forming an image on a sheet, comprises a cartridge for storing a toner, a processing unit for transferring and fixing a toner image on a sheet, a tray for stacking sheets before an image is formed on the sheet and a tray for stacking sheets formed with an image. The storage apparatus 115 is an auxiliary storage apparatus, such as an HDD (Hard disk drive), which stores data in a non-volatile manner. Printing data intended to be printed by the printer section 114 and parameters corresponding to various kinds of sheets are stored in the storage apparatus 115 in advance.

The control panel 120 consists of a liquid crystal panel (that is, a display section) and a touch sensor (that is, an input section) laminated on the surface of the display section. The control panel 120 accepts an operation instruction of the user, provides an operation screen for the user and displays a processing result. The interface 130 comprises a network card connected with the LAN in the store and communication devices based on near-distance wireless communication standards. The interface 130 may be connected with a network in a wired or wireless manner.

Figure 3:
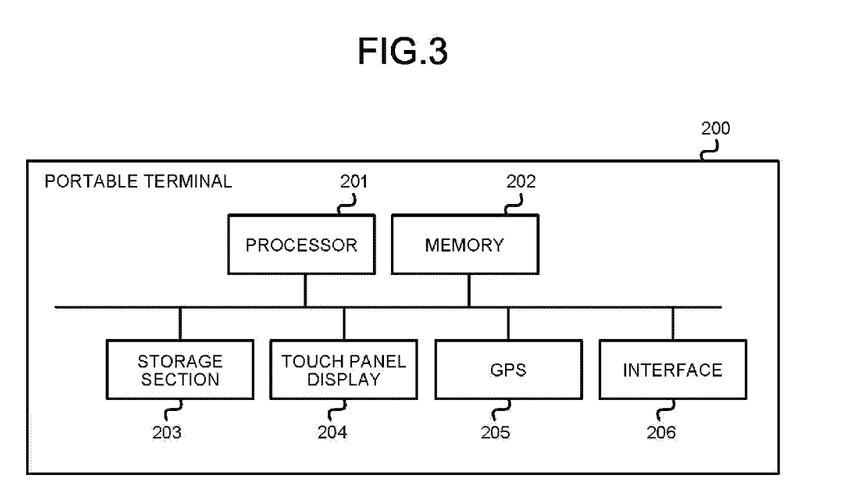
FIG. 3 is a block diagram illustrating a constitution example of a portable terminal.

FIG. 3 is a block diagram illustrating an internal apparatus constitution example of the portable terminal 200. The portable terminal 200, which is set to be a smart phone in the present embodiment, comprises a processor 201, a memory 202, a storage section 203, a touch panel display 204, a GPS (Global Positioning System) 205 and an interface 206. The processor 201 and the memory 202, although different in performance, have the same functions with the processor 111 and the memory 112 of the kiosk terminal 100. The storage section 203 is an auxiliary storage apparatus such as a flash memory. Like the control panel 120 of the kiosk terminal 100, the touch panel display 204 comprises a liquid crystal panel (that is, a display section) and a touch sensor (that is, an input section). The GPS 205 is a GPS receiver for receiving a signal from a satellite and then digitizing the position thereof. The interface 206 comprises a communication device based on near-distance wireless communication standards or a communication device which can be connected with a wide area line network or a wireless LAN. In the present embodiment, the interface 206 communicates with the server 300 via a wide area line network and communicates with the kiosk terminal 100 through near-distance wireless communication or over a wireless LAN.

Figure 4:
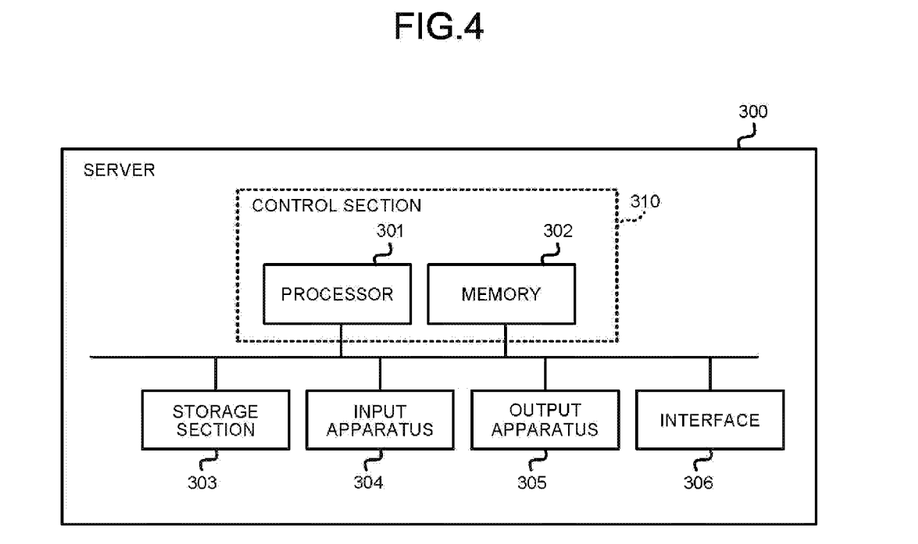
FIG. 4 is a block diagram illustrating a constitution example of a server.

FIG. 4 is a block diagram illustrating an internal constitution example of the server 300 serving as an information processing apparatus. The server 300 comprises a processor 301 serving as an arithmetic apparatus, a memory 302 provided with a volatile storage apparatus and a non-volatile storage apparatus and a storage section 303 serving as an auxiliary storage apparatus such as an HDD. Further, the server 300 further comprises an input apparatus 304 such as a keyboard and a mouse, an output apparatus 305 such as a monitor and an interface 306 such as a network card. Further, a control section 310 serving as a controller comprises the processor 301 and the memory 302. The control section 310 may further comprise the storage section 303.

Figure 5:
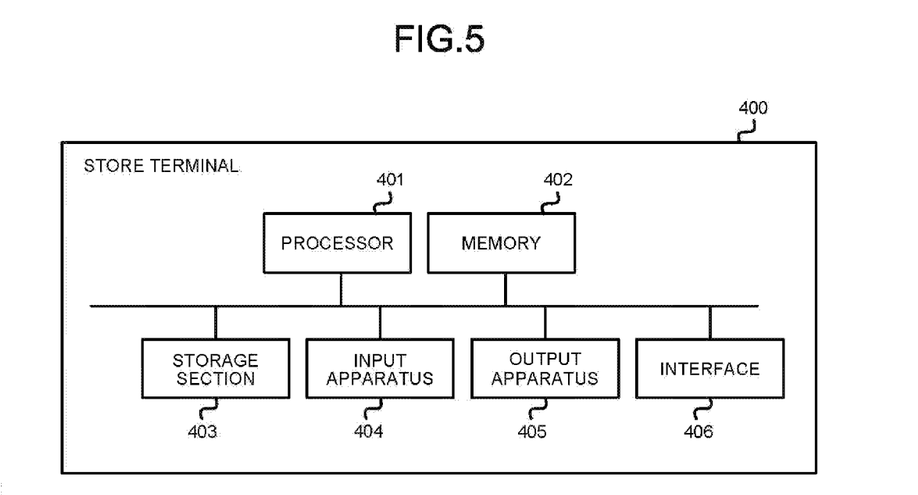
FIG. 5 is a block diagram illustrating a constitution example of a store terminal.

FIG. 5 is a block diagram illustrating an internal constitution example of the store terminal 400. The store terminal 400 shown in FIG. 5 having the same constitution with the server 300 is not described here repeatedly. Further, the reference sign shown in FIG. 5 is marked by adding 100 to a corresponding reference sign shown in FIG. 4.

Figure 6:
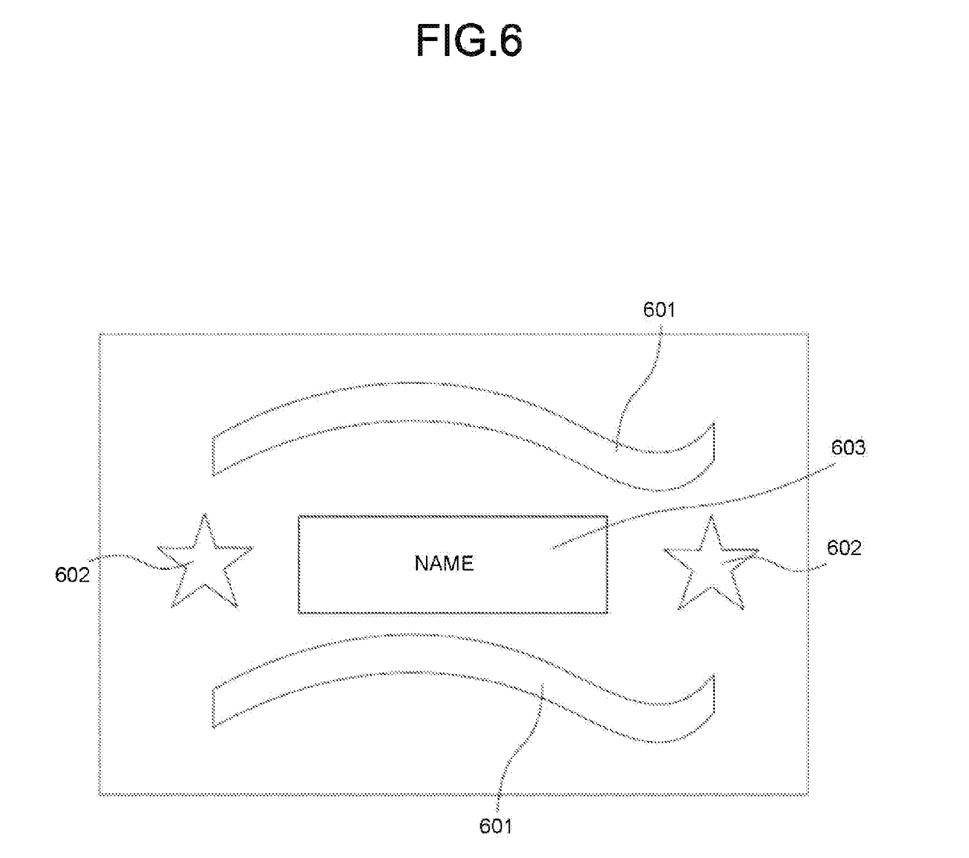
FIG. 6 is a diagram illustrating an example of a specially processed sheet on which an image and text information are added by a user.

FIG. 6 is a diagram illustrating an example of the design of a print target. A wave pattern 601 shown in FIG. 6 represents a preprinted portion processed with gold leaf, and the star pattern 602 and the 'name' 603 in the center are examples of a mark and a text which can be added by a user. The image and the text added by the user are hereinafter referred to as objects.

In accordance with the present embodiment, design template contains restriction information representing a position where an object can be arranged and a position where an object cannot be arranged. For example, restriction information such as 'objects cannot be arranged on the wave pattern 601' is contained in a design template. Further, there is a restriction on the object which cannot be used by a user, and there are objects that cannot be used according to a design template. In this way, the sheet information such as the size, the material and the thickness of a sheet, the information relating to a specially processed design, an object that can be used by the user and an arrangement position, and the identification information of the sheet are associated with each other in a design template. The user uses the portable terminal 200 to select a desired design from a plurality of design templates.

Figure 7:
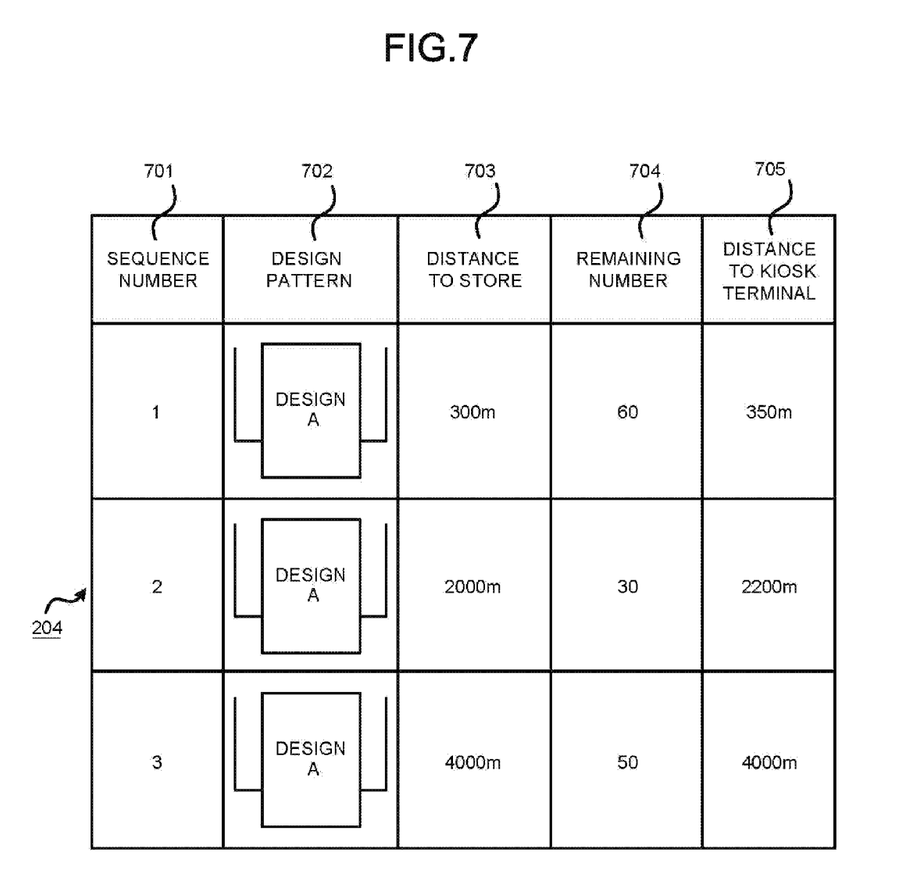
FIG. 7 is a diagram illustrating a display example of a table of corresponding stores and corresponding kiosk terminals on a portable terminal.

FIG. 7 shows an image displayed by the portable terminal 200 after a design template is selected. After selecting a design template, the user presses a specific button to display the information shown in FIG. 7 on the touch panel display 204. In the present embodiment, after a specific button is pressed, the identification information of a sheet selected by the user, the number of printings and the position information of the portable terminal 200 are sent to the server 300 together with an inquiry telegram. The server 300 acquires the information and specifies a store dealing in the design template and a kiosk terminal capable of carrying out a printing process. The server 300 inquires of the store terminal 400 about the stock quantities of each kind of sheets in the store. Further, the server 300 calculates the distance from the portable terminal 200 to the store and the distance from the portable terminal 200 to the kiosk terminal 100. The results are fed back to the portable terminal 200.

The touch panel display 204 lists a column 701 of sequence number, a column 702 of identification information (or the design pattern show in FIG. 7) of a sheet selected by a user, a column 703 of the distance to a store dealing in sheets, a column 704 of the remaining number of sheets and a column 705 of the distance to a kiosk terminal in the store. The distance to a store and the distance to a kiosk terminal are distances from the portable terminal 200 to the store and the kiosk terminal. Further, the name, the address and the telephone number of a store and the floor where the kiosk terminal is arranged may be displayed with distance information instead of the aforementioned distance information.

Figure 8:
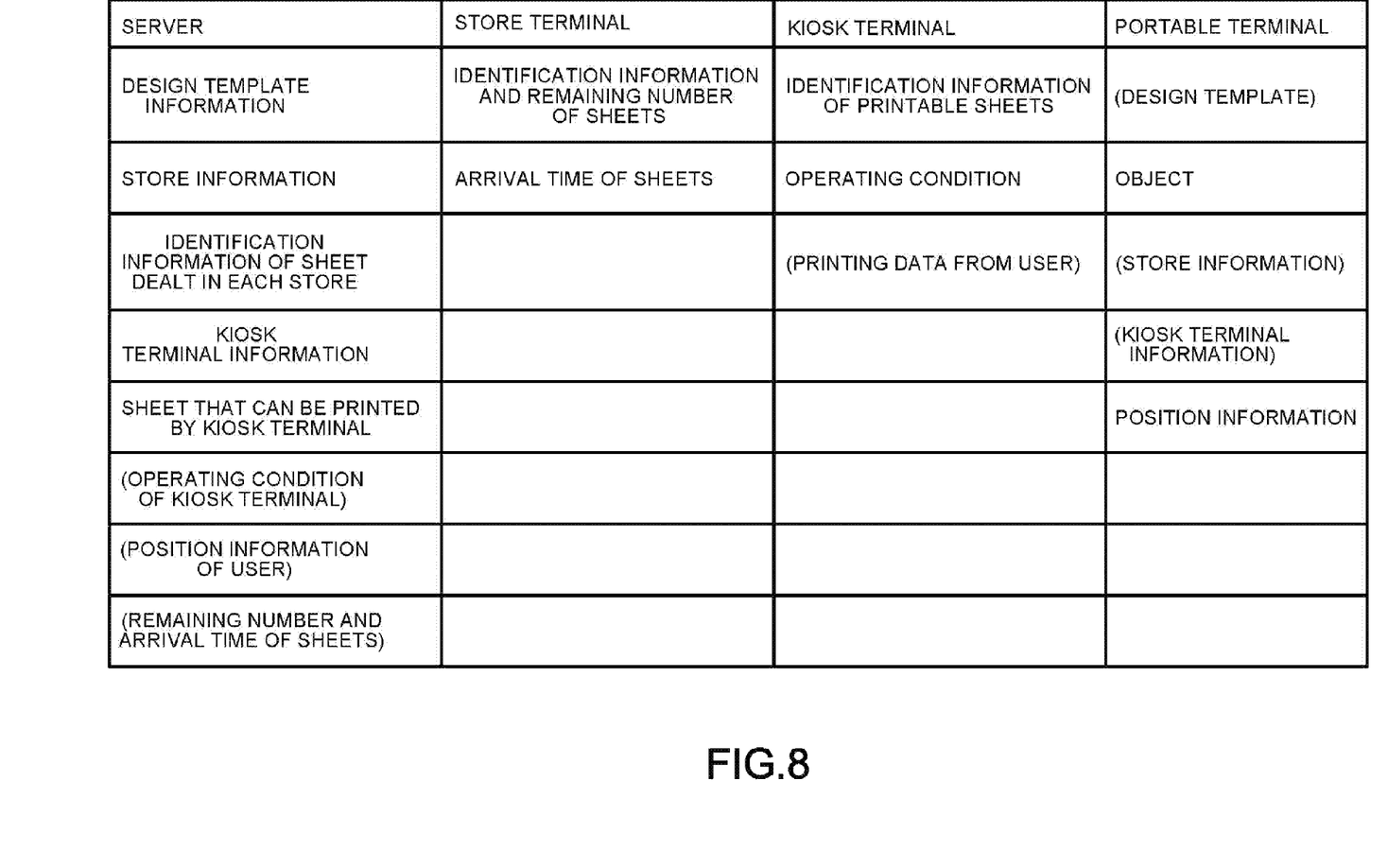
FIG. 8 shows an example of data processed by each apparatus.

FIG. 8 shows examples of the data processed by the server 300, the store terminal 400, the kiosk terminal 100 and the portable terminal 200. Further, the data in brackets shown in FIG. 8 represents information acquired from other apparatuses, and the data not bracketed represents data stored in each apparatus in advance or data manually input to each apparatus by the user.

The server 300 stores the list of design templates in the storage section 303. A design template is a data configuration associating the aforementioned information such as the design and the size of a sheet with identification information. The server 300 further stores store information. The store information is data associating the identification information of a store, the name, the address, the telephone number and the position information of the store, and the information (e.g. IP address) of the store terminal 400 in the premises of the store with each other. The server 300 stores a list of the data. The server 300 stores data associating the identification information of the store with the identification information of a sheet processed in the store.

Further, the server 300 stores a list of kiosk terminal information. The kiosk terminal information refers to the identification information and the position information of the kiosk terminal 100, the identification information of a store in which the kiosk terminal 100 is arranged, the model number of machine and an IP address. The server 300 further stores data associating the identification information of the kiosk terminal 100 with the identification information of a sheet which can be printed by the kiosk terminal 100.

The server 300 inquires of the kiosk terminal 100 to acquire the operating condition of each kiosk terminal. Further, the position information of the portable terminal 200 is acquired from the portable terminal 200 as the position information of the user. Further, the server 300 inquires of the store terminal 400 to acquire stock quantities of sheets (the remaining number of sheets) in the store and the arrival time of sheets.

The store terminal 400 stores the identification information, the stock quantities and the arrival time of sheets in the storage section 403. The information is manually input by the manager/user of the store terminal 400 or input from another system (e.g. a stock management system).

The kiosk terminal 100 stores the identification information of printable sheets in the storage apparatus 115 in the form of a list. Further, if the kiosk terminal 100 acquires operating inquiry telegram from the server 300, the kiosk terminal 100 sends reply telegram. When the user carries out a printing job, the kiosk terminal 100 receives printing data from the portable terminal 200.

The portable terminal 200 downloads specific data of a design template associated with the identification information of a sheet from the server 300. The specific data refers to a layout or pre-printed image data, image data of an arrangeable object, and available text font, color and font size. Further, the potable terminal 200 acquires object information added according to the operation of a user and stores the acquired object information in the storage section 203. The object information is image data such as a mark, or data such as text information, a configuration position, a size, the form and color of a font and a font size and the like. The portable terminal 200 acquires store information and kiosk terminal information from the server 300. Further, the portable terminal 200 specifies its own position using the GPS 205 and sends the position information thereof to the server 300.

Figure 9:
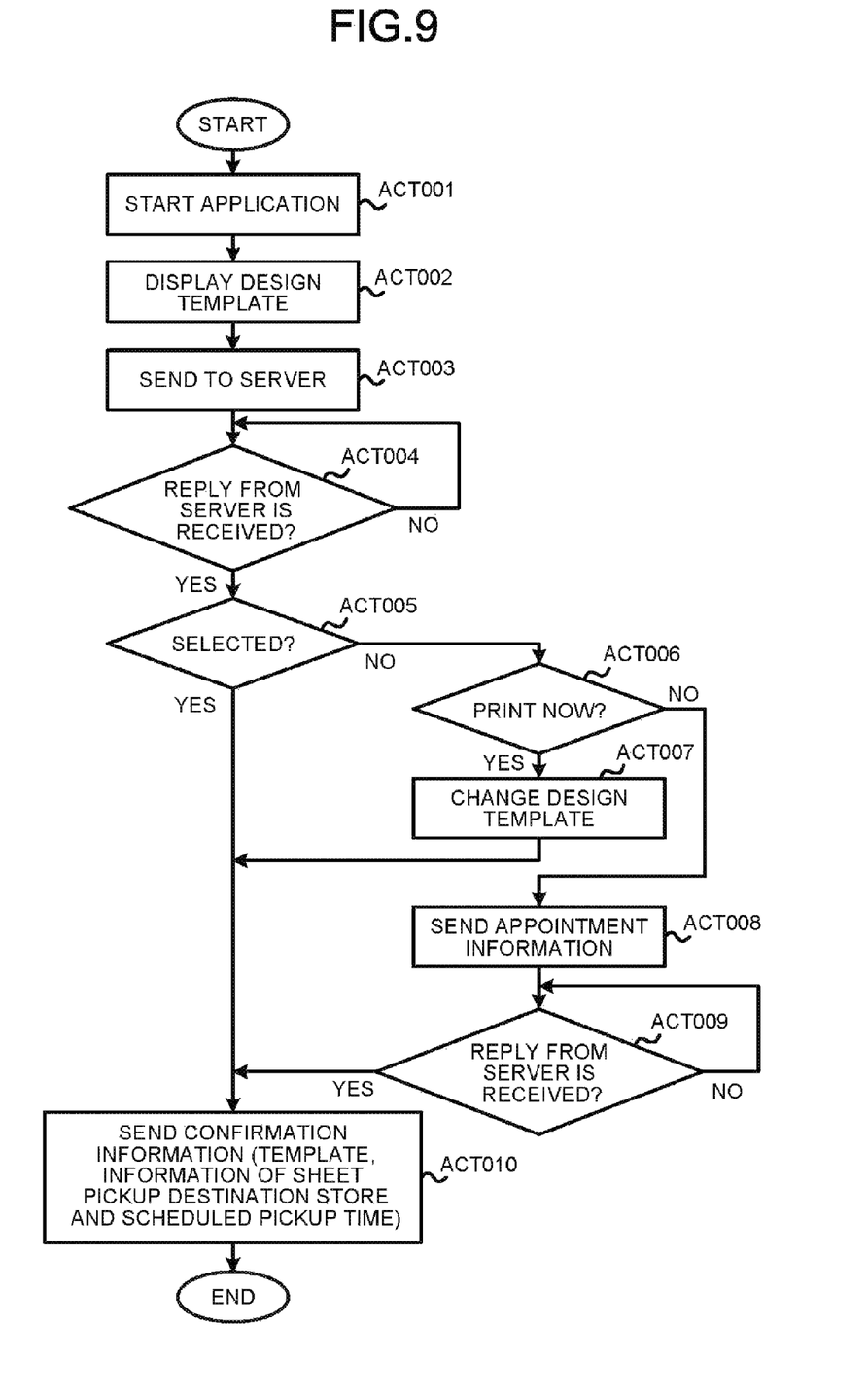
FIG. 9 is a flowchart illustrating an example of operation carried out by a portable terminal until a store and a kiosk terminal to be used are determined.
Figure 10:
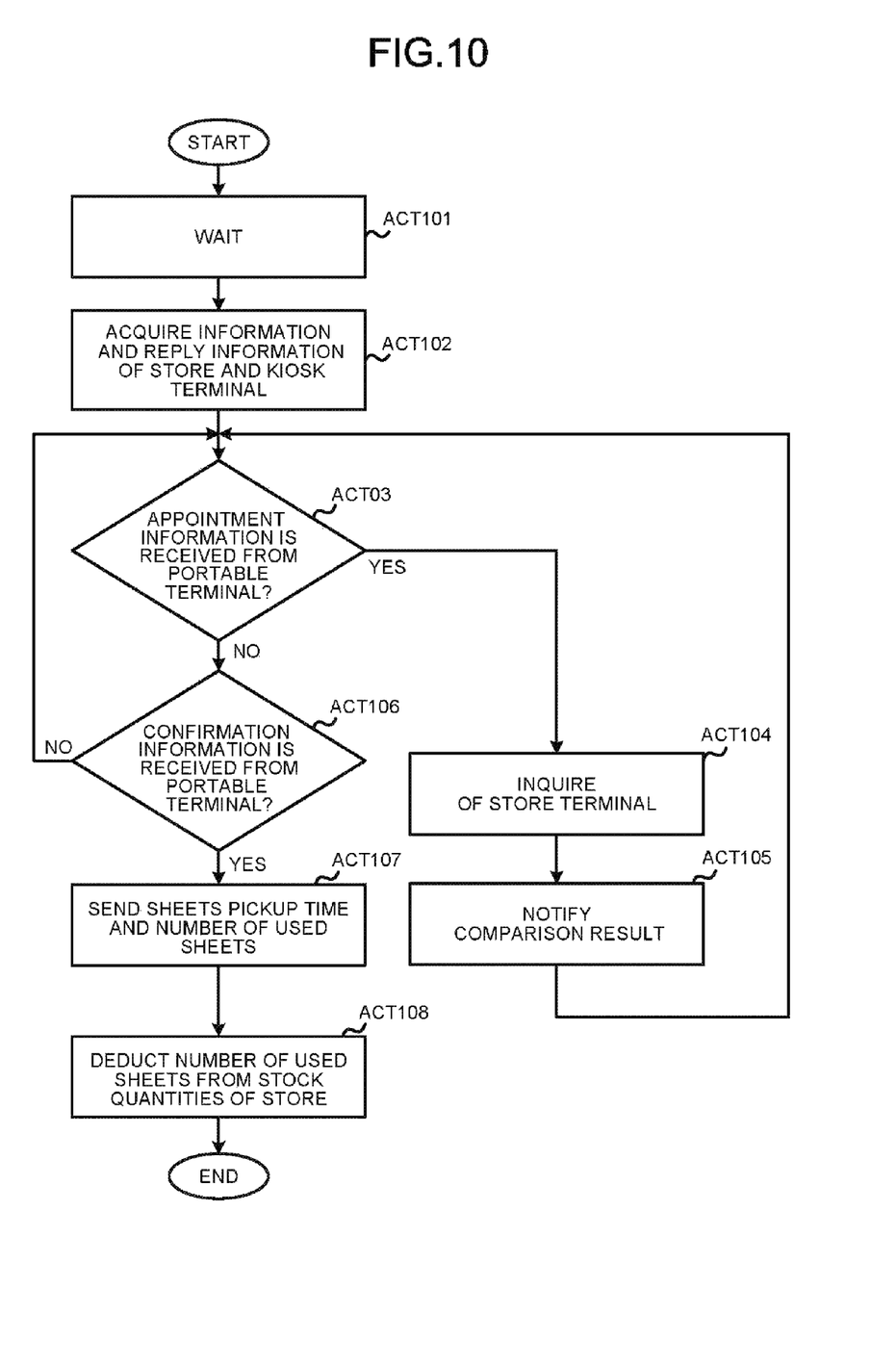
FIG. 10 is a flowchart illustrating an example of operation carried out by a server until a store and a kiosk terminal to be used are determined.

Next, examples of the operation carried out by the portable terminal 200 and the server 300 before an appointment with a store is made after a design template is selected. FIG. 9 is a flowchart illustrating an operation example of the portable terminal 200, and FIG. 10 is a flowchart illustrating an operation example of the server 300.

First, an operation example of the portable terminal 200 is described with reference to FIG. 9. The operations shown in FIG. 9 are realized by executing the programs pre-stored in the memory 202 or the storage section 203 using the processor 201 and cooperating with each piece of hardware in the portable terminal 200.

The processor 201 of the portable terminal 200 detects that the user selects an image (icon) displayed on a menu screen through the touch panel display 204 and then starts the application (software) (ACT 001). The processor 201 displays the list of the design templates on the touch panel display 204 (ACT 002). The list displayed herein may be design templates imported together with the application or design templates acquired from the server 300 via the interface 206. The user selects a design template to be used from the displayed list. The processor 201 sends the identification information of a sheet corresponding to the design template selected by the user and the required number of sheets to the server 300 (ACT 003). At this time, the processor 201 further sends the position information of the portable terminal 200 acquired by the GPS 205 to the server.

The processor 201 waits until the processor 201 receives response information from the server 300 (loop of NO in ACT 004). If the processor 201 receives response information via the interface 206 (YES in ACT 004), the processor 201 displays the information on the touch panel display 204 in a form of a list as shown in FIG. 7. Then, the processor 201 determines whether or not a store or a kiosk terminal is selected from the displayed list by the user (ACT 005). On the other hand, if there is no suitable store or kiosk terminal (extraction result in server 300 is 0), or the user does not select a store or kiosk terminal (NO in ACT 005), the processor 201 displays a dialogue on the touch panel display 204 to inquire whether or not to carry out a printing job now (ACT 006). If it is needed to print now (YES in ACT 006), the processor 201 displays a screen on the touch panel display 204 for the user to select a design template (ACT 007). After ACT 007, a design template is determined, and then the flow proceeds to ACT 010.

On the other hand, if it is selected that it's not necessary to print now in the dialogue in ACT 006 (NO in ACT 006), the processor 201 displays a selection screen such as 'prepare the current design template you select in which store by which time' on the touch panel display 204. As to the designation on time, items such as 'two or three days', 'within one week' or 'within one month' are displayed for the user to select, or a specified time numeral is directly input by the user. The store and the time designated herein and the sheet identification information and the number of sheets designated earlier constitute appointment information. The processor 201 sends the appointment information to the server 300 via the interface 206 (ACT 008).

The processor 201 waits until the processor 201 acquires response telegram from the server 300 (NO in ACT 009), and ACT 010 is carried out if the response telegram is received (YES in ACT 009). The response telegram received herein contains the result of a determination on whether or not sheets arrive within the designated time and specific scheduled arrival time. Further, in a case where sheets cannot arrive within the designated time, ACT 010 is carried out if the user agrees on the scheduled arrival time of sheets, or the flow returns to ACT 008 if the user does not agree on the scheduled arrival time of sheets.

In ACT 010, the processor 201 acquires sheet pickup time input by the user through the touch pane display 204 and displays a final confirmation screen, on which the user presses a specific button to confirm sheets pickup time, the information of a pickup destination store, sheet identification information and the number of sheets. The processor 201 sends the confirmed information to the server 300 (ACT 010). Then, the operations of the portable terminal 200 are ended temporarily.

FIG. 10 is a diagram illustrating an operation example of the server 300 before an appointment with a store is made after a design template is selected. The operations shown in FIG. 10 are controlled by the control section 310. That is, the operations shown in FIG. 10 are realized by executing the programs pre-stored in the memory 302 or the storage section 303 using the processor 301 and cooperating with each piece of hardware in the server 300.

If the control section 310 detects a receiving event, the control section resumes from the standby state (ACT 101). The control section 310 sends a receiving instruction to the interface 306, and the interface 306 acquires the identification information of a sheet designated by the user, the required number of sheets and the position information of the portable terminal 200. The control section 310 replies the information of a corresponding store and kiosk terminal to the portable terminal 200 (ACT 102) using the acquired information. The control section 310 selects a store and a kiosk terminal in the following way:

1. the control section 310 acquires, based on the identification information of the sheet, information of a store dealing in the design template with reference to the data shown in FIG. 8. Further, the control section 310 acquires, based on the identification information of the sheet, a kiosk terminal capable of printing the design template with reference to the data shown in FIG. 8.

2. the control section 310 sorts the extracted stores and kiosk terminals in the ascending order of the distances from the stores and the kiosk terminals to the portable terminal 200 based on the position information sent from the portable terminal 200.

3. the control section 310 excludes the stores and the kiosk terminals which are more than a given distance (e.g. 10 Km) away from the portable terminal 200. Further, the exclusion processing may not be carried out.

4. the control section 310 acquires the stock quantities of sheets to be used for the design template based on the identification information of the sheet. The control section 310 acquires the stock quantities from a store terminal in the premises of a store extracted before the aforementioned point 3 is carried out.

The control section 310 replies information of the stores (including stock quantities of sheets) and the kiosk terminals selected in the way above to the portable terminal 200 requesting for the information via the interface 306. The information of the stores contains the information of distances between the stores and the portable terminal 200, and the information of the kiosk terminals contains the information of distances between the kiosk terminals and the portable terminals 200. The control section 310 replies data representing 'no suitable store and kiosk terminal' when there is no suitable stores or kiosk terminals.

The control section 310 determines whether or not appointment information is received (ACT 103). If it is determined that appointment information is received (YES in ACT 103), the control section 310 creates telegram for inquiring that whether or not sheets can arrive within the time designated by the user, and instructs the interface 306 to send the telegram to the store terminal 400 of a designated store (ACT 104). At this time, the control section 310 further sends the identification information of the sheet and the number of sheets used by the user.

The processor 401 of the store terminal 400 acquires the arrival time of the sheets from the storage section 403 or the memory 402 based on the identification information and the number of sheets. If sheets can arrive within the specified time, then specific arrival time is replied to the server 300. Otherwise, telegram representing that sheets cannot arrive within the specified time and specific scheduled arrival time of sheets are replied to the server 300. Further, the determination on whether or not sheets can arrive within the time designated by the user may be carried out by the control section 310 of the server 300. In this case, the store terminal 400 sends the arrival time of sheets to the server 300, and the control section 310 carries out a comparison determination.

The control section 310 of the server 300 activates the interface 306 to send the result of the determination on whether or not sheets can arrive within the designated time and the specific scheduled arrival time of sheets to the portable terminal 200 (ACT 105). Then, the flow returns to the determination operation in ACT 103. Further, if sheets cannot arrive in time, the control section 310 sends telegram representing that sheets cannot arrive in time and the scheduled arrival time of sheets to the portable terminal 200.

If the control section 310 determines that no appointment information is received (NO in ACT 103), the control section determines whether or not confirmation information is received (ACT 106). If it is determined that no confirmation information is received (NO in ACT 106), then the control section 310 returns to carry out ACT 103. On the other hand, if it is determined that confirmation information is received (YES in ACT 106), then the control section 310 activates the interface 306 to send sheets pickup time and the number of sheets to be used to a determined store terminal 400 (ACT 107). Next, the control section 310 deducts the number of sheets to be used from the stock quantities (ACT 108). Further, a processing equivalent to ACT 108 may not be carried out by the server 300 but by the store terminal 400 instead.

Figure 11:
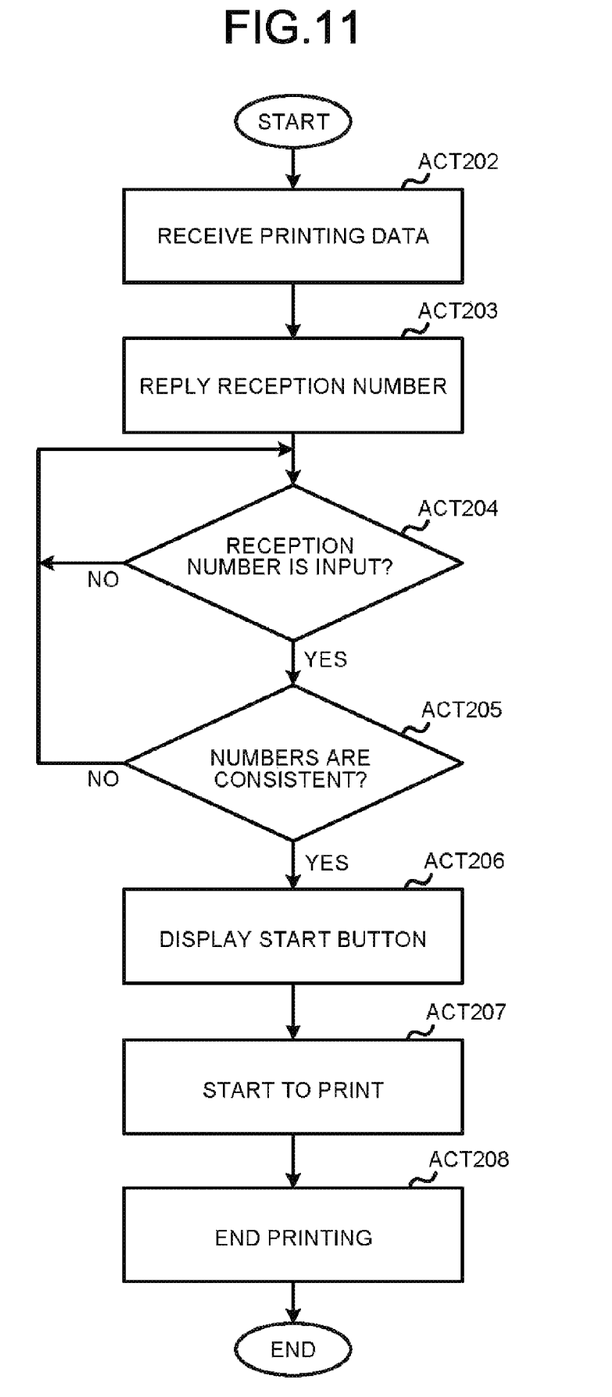
FIG. 11 is a diagram illustrating an example of operation carried out by a kiosk terminal when printing on a sheet.

The user carrying out the procedure described with reference to FIG. 9 and FIG. 10 goes to the store to pick up designated sheets and carry out a printing job after the appointed time. An operation example of the kiosk terminal 100 at this time is shown in FIG. 11. Further, the user customizes (adds a mark or a text) the designated design template.

First, the user obtains the designated sheets from the store, approaches the kiosk terminal (here set to be the kiosk terminal 100), and places the obtained sheets on a paper feed tray. The processor 201 of the portable terminal 200 sends the design template data of a print target to the kiosk terminal 100 via the interface 206 according to the operation of the user.

Next, the operations of the kiosk terminal are described with reference to FIG. 11. The processor 111 of the kiosk terminal 100 resumes from a standby state, receives printing data via the interface 106 and temporarily stores the printing data in the memory 112 or the storage apparatus 115 (ACT 202). Then, the processor 111 exports a unique reception number and sends the reception number to the portable terminal 200 via the interface 106 (ACT 203).

The processor 201 of the portable terminal 200 displays the received reception number on the touch panel display 204. After confirming the displayed reception number, the user inputs the number to the control panel 120 of the kiosk terminal 100.

The processor 111 of the kiosk terminal 100 waits for the input of the reception number (loop of NO in ACT 204). If the processor 111 acquires the reception number (YES in ACT 204), the processor 111 determines whether or not the input reception number is the number exported by itself (ACT 205). If the input reception number is not the number exported by itself (NO in ACT 205), the processor 111 returns to carry out ACT 204. If the input reception number is the number exported by itself (YES in ACT 205), the processor 111 displays a print start button on the control panel 120 (ACT 206). If the print start button is pressed, the processor 111 activates the image processing section 113 and the printer section 114 to print the printing data temporarily stored in the memory 112 or the storage apparatus 115 on the sheet placed on the paper feed tray (ACT 207). The current operation is ended after the printing process is ended (ACT 208). Further, the processor 111 may enter in a standby state and return to ACT 201.

The present embodiment has the following advantages that:

A design is combined with a printed sheet in advance, and a user can designate the combination. Further, choices of design are increased.

The design can be edited at the portable terminal of the user.

The printed sheet can be processed in the store.

A design template which associates a design with a sheet to be combined in advance can be used.

Information of a store dealing in a sheet can be confirmed by the portable terminal of the user.

The position of a kiosk terminal applicable to each sheet can be confirmed by a portable terminal.

In a case where the store doesn't deal in the sheet, a plurality of choices are prepared for a user to determine, such as appoint, or obtain from other store, or change the design.

In the present embodiment, a design template associating a design desired to be printed with a sheet category is used. The design template is selected according to preferences of the user, and a sheet is obtained in a store and printed by a kiosk terminal capable of carrying out a printing operation.

Further, a kiosk terminal also has a communication function to communicate with the portable terminal of the user. The flow from the acquisition of a sheet to the printing is realized by acquiring information of a store where the sheet can be obtained, the position of a kiosk terminal and the operating condition of the kiosk terminal.

Further, due to the distance between the position of the user and a store or an information terminal, a desired print target cannot be obtained sometimes. In the conventional case, even if a store dealing in the sheet is known, the printing job is given up or other choices must be made to collect information from the beginning again. In a case where the store doesn't deal in the sheet, an appointment can be made; however, it's necessary to change the sheet in a chase where a printing job needs to be carried out immediately. In the present embodiment, another replacement design can be immediately selected using a dedicated server which uniformly manages design templates, and information of store and information terminal.

In the present embodiment, data of a design template is acquired from the dedicated server by using a personal portable terminal. As stated above, a design template contains information of a design and layout serving as a base for the user to edit, and information such as the material and the size of a sheet, whether or not the sheet is specifically processed, the material for the special processing, and the identification information of the sheet and the like. The portable terminal acquires, from the dedicated server, the position information of a store dealing in the sheet and the stock quantities of the sheets in the store. Further, the portable terminal acquires the position information and the operating condition of a kiosk terminal capable of printing the sheet from the dedicated server. In this way, the user can select a design template, acquire a suitable sheet in a store and print the sheet with a kiosk terminal smoothly.

With the structure above, the user can confirm whether or not sheets are available in advance and confirm whether or not a kiosk terminal can deal with a special sheet without going to a store or making a store inquiry. Further, an appointment may be made to ensure sheets available.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus, comprising:
    an interface configured to receive identification information of a user-designated sheet sent from a first terminal and position information of the first terminal; and
    a control section configured to
        specify, based on the identification information of the user-designated sheet and the position information of the first terminal, and including an information terminal capable of forming an image on a sheet designated by a user from the data stored in a storage section and send information relating to the information terminal to the first terminal via the interface, and
        acquire, if there is no information terminal capable of forming an image, information of time when the sheet is needed from the first terminal using the interface and sends the result of a determination on whether or not the sheets arrival time is within the time to the first terminal.

2. The information processing apparatus according to claim 1, wherein
    the control section further sends the distance from the first terminal to the specified information terminal to the first terminal using the interface.

3. The information processing apparatus according to claim 1, wherein
    the control section further specifies a store dealing in the sheet from the data stored in a storage section based on the identification information of the sheet and the position information and sends information relating to the store to the first terminal using the interface.

4. The information processing apparatus according to claim 3, wherein
    the control section further sends the distance from the first terminal to the specified store to the first terminal using the interface.

5. The information processing apparatus according to claim 3, wherein
    the control section further sends the stock quantities of the sheets in the store to the first terminal.

6. The information processing apparatus according to claim 3, wherein
    the control section acquires, further if there is no store dealing in the sheet, information of time when the sheet is needed from the first terminal using the interface and sends the result of a determination on whether or not the sheets arrival time of the store is within the time to the first terminal.

7. The information processing apparatus according to claim 3, wherein
    the control section further acquires the number of sheets used by the user from the first terminal using the interface and deducts the acquired number of sheets from the stock quantities of sheets dealt in the store.

8. An image processing method, including:

receiving the identification information of a user-designated sheet sent from a first terminal and the position information of the first terminal;

specifying, based on the identification information of the sheet and the position information, an information terminal capable of forming an image on the sheet designated by a user from the data stored in a storage section;

acquiring, if there is no information terminal capable of forming an image, information of time when the sheet is needed from the first terminal using the interface and sends the result of a determination on whether or not the sheets arrival time is within the time to the first terminal; and sending information relating to the specified information terminal to the first terminal.

9. The information processing method according to claim 8, further including:

sending the distance from the first terminal to the specified information terminal to the first terminal.

10. The information processing method according to claim 8, further including:

specifying a store dealing in the sheet from the data stored in a storage section based on the identification information of the sheet and the position information and sending information relating to the store to the first terminal.

* * * * *